(12) United States Patent
Fattal

(10) Patent No.: US 10,768,357 B2
(45) Date of Patent: Sep. 8, 2020

(54) POLARIZATION-MIXING LIGHT GUIDE AND MULTIBEAM GRATING-BASED BACKLIGHTING USING SAME

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 77 days.

(21) Appl. No.: 15/638,061

(22) Filed: Jun. 29, 2017

(65) Prior Publication Data

US 2017/0299799 A1 Oct. 19, 2017

Related U.S. Application Data

(63) Continuation of application No. PCT/US2015/010932, filed on Jan. 10, 2015.

(51) Int. Cl.
*G02B 6/42* (2006.01)
*G02F 1/1335* (2006.01)
(Continued)

(52) U.S. Cl.
CPC .......... *G02B 6/0056* (2013.01); *G02B 6/005* (2013.01); *G02B 6/0035* (2013.01);
(Continued)

(58) Field of Classification Search
CPC ...... G02B 6/2726; G02B 6/00; G02B 5/3083; G02B 6/0056; G02B 27/22; G02B 30/26;
(Continued)

(56) References Cited

U.S. PATENT DOCUMENTS 5,615,024 A 3/1997 May et al.
5,617,248 A 4/1997 Takahashi et al.
(Continued)

FOREIGN PATENT DOCUMENTS

CN 1213097 A 4/1999
CN 1619373 A 5/2005
(Continued)

OTHER PUBLICATIONS

International Search Report (ISR), 3 pages, from KIPO (ISA/KR), dated Aug. 27, 2015, for counterpart parent PCT patent application No. PCT/US2015/010932.
(Continued)

*Primary Examiner* — Michael H Caley
*Assistant Examiner* — Mariam Qureshi
(74) *Attorney, Agent, or Firm* — J. Michael Johnson

(57) ABSTRACT

A polarization-mixing light guide includes a plate light guide and a polarization retarder within the plate light guide. The light guide is to guide a beam of light at a non-zero propagation angle. The light beam includes a first polarization component and a second polarization component. The polarization retarder is to redistribute the first and second polarization components of the guided light beam into predetermined combinations of the polarization components. The light guide is to preferentially scatter out a portion of the guided light beam having the first polarization component. A three-dimensional (3-D) electronic display includes an array of multibeam diffraction gratings at a surface of the plate light guide to preferentially couple out the first polarization component of the guided light beam as a plurality of light beams having different principal angular directions.

20 Claims, 4 Drawing Sheets

(51) Int. Cl.
*F21V 8/00* (2006.01)
*G02F 1/13357* (2006.01)
*G02F 1/29* (2006.01)

(52) U.S. Cl.
CPC ............. *G02B 6/0055* (2013.01); *G02B 6/42* (2013.01); *G02F 1/13362* (2013.01); *G02F 1/133504* (2013.01); *G02F 1/292* (2013.01)

(58) Field of Classification Search
CPC . G02B 5/18; G02F 1/13363; G02F 1/133634; G02F 2001/133631; G02F 2413/01; G02F 2201/30; G02F 2201/302; G02F 2201/305; G02F 2201/307; G02F 1/133524; G02F 1/13362; H04N 13/04
See application file for complete search history.

(56) References Cited

U.S. PATENT DOCUMENTS

| | | | |
|---|---|---|---|
| 5,721,598 | A | 2/1998 | Smith |
| 5,729,311 | A | 3/1998 | Broer et al. |
| 5,926,294 | A | 7/1999 | Sato et al. |
| 6,020,944 | A * | 2/2000 | Hoshi .................. G02B 6/0038 349/62 |
| 6,667,819 | B2 | 12/2003 | Nishikawa et al. |
| 6,980,271 | B2 | 12/2005 | Fujishiro |
| 7,742,120 | B2 | 6/2010 | Bayley et al. |
| 7,773,849 | B2 | 8/2010 | Shani |
| 7,903,332 | B2 | 3/2011 | De Zwart et al. |
| 8,026,997 | B2 | 9/2011 | Feng |
| 8,619,363 | B1 | 12/2013 | Coleman |
| 8,681,423 | B1 | 3/2014 | Gibson et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2002/0008834 | A1 | 1/2002 | Suzuki |
| 2002/0015314 | A1 * | 2/2002 | Umemoto ............ G02B 6/0038 362/561 |
| 2002/0075445 | A1 | 6/2002 | Dabrowski et al. |
| 2002/0176165 | A1 | 11/2002 | Lee et al. |
| 2003/0086649 | A1 | 5/2003 | Zhou |
| 2004/0051927 | A1 | 3/2004 | Tsai et al. |
| 2004/0130879 | A1 | 7/2004 | Choi et al. |
| 2004/0141108 | A1 * | 7/2004 | Tanaka ................. G02B 6/0038 349/96 |
| 2004/0156182 | A1 | 8/2004 | Hatjasalo et al. |
| 2004/0156589 | A1 | 8/2004 | Gunn et al. |
| 2005/0041174 | A1 | 2/2005 | Numata et al. |
| 2005/0073627 | A1 | 4/2005 | Akiyama |
| 2005/0123229 | A1 | 6/2005 | Huck et al. |
| 2005/0140832 | A1 | 6/2005 | Goldman et al. |
| 2005/0201122 | A1 | 9/2005 | Shinohara et al. |
| 2005/0264717 | A1 | 12/2005 | Chien et al. |
| 2006/0008347 | A1 | 4/2006 | Winkler |
| 2006/0104570 | A1 | 5/2006 | Rausch |
| 2007/0058394 | A1 | 3/2007 | Yu |
| 2007/0129864 | A1 | 6/2007 | Tanaka et al. |
| 2007/0213955 | A1 | 9/2007 | Ishida et al. |
| 2007/0279367 | A1 | 12/2007 | Kitai |
| 2007/0298533 | A1 | 12/2007 | Yang et al. |
| 2008/0204663 | A1 | 8/2008 | Balogh |
| 2008/0204873 | A1 | 8/2008 | Daniell |
| 2008/0225393 | A1 | 9/2008 | Rinko |
| 2008/0285307 | A1 | 11/2008 | Aylward et al. |
| 2008/0297696 | A1 * | 12/2008 | Banerjee ............ G02B 5/3058 349/65 |
| 2009/0091837 | A1 | 4/2009 | Chao et al. |
| 2009/0207342 | A1 | 8/2009 | Yamaguchi et al. |
| 2009/0213300 | A1 | 8/2009 | Daiku |
| 2009/0244706 | A1 | 10/2009 | Levola et al. |
| 2009/0290837 | A1 | 11/2009 | Chen et al. |
| 2009/0322986 | A1 | 12/2009 | Wei et al. |
| 2010/0039832 | A1 | 2/2010 | Ahlgren et al. |
| 2010/0103485 | A1 | 4/2010 | Haussler |
| 2010/0118117 | A1 | 5/2010 | Kroll et al. |
| 2010/0123952 | A1 | 5/2010 | Chen et al. |
| 2010/0207964 | A1 | 8/2010 | Kimmel et al. |
| 2010/0284085 | A1 | 11/2010 | Laakkonen |
| 2010/0289870 | A1 | 11/2010 | Leister |
| 2010/0302803 | A1 | 12/2010 | Bita et al. |
| 2011/0002143 | A1 | 1/2011 | Saarikko et al. |
| 2011/0141395 | A1 * | 6/2011 | Yashiro ................ G02B 6/0036 349/62 |
| 2011/0149596 | A1 | 6/2011 | Lv et al. |
| 2011/0157257 | A1 | 6/2011 | Bennett et al. |
| 2011/0157667 | A1 | 6/2011 | Lacoste et al. |
| 2011/0182570 | A1 | 7/2011 | Yeh |
| 2011/0241573 | A1 | 10/2011 | Tsai et al. |
| 2011/0254916 | A1 | 10/2011 | Fan et al. |
| 2011/0304784 | A1 | 12/2011 | Hirota et al. |
| 2012/0008067 | A1 | 1/2012 | Mun et al. |
| 2012/0013962 | A1 | 1/2012 | Subbaraman et al. |
| 2012/0075698 | A1 | 3/2012 | Minami |
| 2012/0113678 | A1 | 5/2012 | Cornelissen et al. |
| 2012/0120213 | A1 | 5/2012 | Ohyama et al. |
| 2012/0127547 | A1 | 5/2012 | Gocho et al. |
| 2012/0127573 | A1 | 5/2012 | Robinson et al. |
| 2012/0127751 | A1 | 5/2012 | Kimmel |
| 2012/0176665 | A1 | 7/2012 | Song et al. |
| 2012/0249934 | A1 | 10/2012 | Li et al. |
| 2012/0250141 | A1 | 10/2012 | Chen |
| 2013/0057539 | A1 | 3/2013 | Kim |
| 2013/0082980 | A1 | 4/2013 | Gruhlke et al. |
| 2013/0201723 | A1 | 8/2013 | Gourlay |
| 2015/0355403 | A1 | 12/2015 | Santori et al. |
| 2016/0018582 | A1 | 1/2016 | Fiorentino et al. |
| 2016/0091752 | A1 * | 3/2016 | Lien .................. G02F 1/133504 349/68 |
| 2016/0091775 | A1 * | 3/2016 | Gibson ................ G02B 6/0035 349/186 |
| 2016/0154291 | A1 * | 6/2016 | Gibson .................. G02F 1/139 349/33 |
| 2017/0090096 | A1 | 3/2017 | Fattal |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 1997043594 A | 2/1997 |
| JP | 2000267041 A | 9/2000 |
| JP | 2002031788 A | 1/2002 |
| JP | 2004077897 A | 3/2004 |
| JP | 2004302186 A | 10/2004 |
| JP | 2008083532 A | 4/2008 |
| JP | 2008164963 A | 7/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| WO | 9908257 A1 | 2/1999 |
| WO | 2012069071 A1 | 5/2012 |

OTHER PUBLICATIONS

Li, Yan, et al., "A broadband wide-incident-angle reflective polarization converter," Journal of the Society for Information Display (SID), 2009, pp. 849-852, 17/10.

Meadowlark Optics, "Principles of Retarders," Brochure from Meadowlark Optics (www.meadowlark.com), pp. 20-31.

Fattal, David et al, "A multi-directional backlight for a wide-angle, glasses-free three-dimensional display," Nature, Mar. 21, 2013, pp. 348-351, vol. 495, Macmillan Publishers Limited, 2013.

(56) References Cited

OTHER PUBLICATIONS

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Xu et al., "Computer-Generated Holography for Dynamic Display of 3D Objects with Full Parallax," International Journal of Virtual Reality, 2009, pp. 33-38, vol. 8, No. 2.

Travis et al., "Collimated light from a waveguide for a display backlight," Optics Express, Oct. 2009, pp. 19714-19719, vol. 17, No. 22.

\* cited by examiner

US 10,768,357 B2

POLARIZATION-MIXING LIGHT GUIDE AND MULTIBEAM GRATING-BASED BACKLIGHTING USING SAME

CROSS-REFERENCE TO RELATED APPLICATIONS

This application is a continuation application of and claims the benefit of priority to prior International Application No. PCT/US2015/010932, filed Jan. 10, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with light emission, many passive displays are coupled to an external light source. The coupled light source may allow these otherwise passive displays to emit light and function substantially as an active display. Examples of such coupled light sources are backlights. Backlights are light sources (often so-called 'panel' light sources) that are placed behind an otherwise passive display to illuminate the passive display. For example, a backlight may be coupled to an LCD or an EP display. The backlight emits light that passes through the LCD or the EP display. The light emitted by the backlight is modulated by the LCD or the EP display and the modulated light is then emitted, in turn, from the LCD or the EP display.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1:
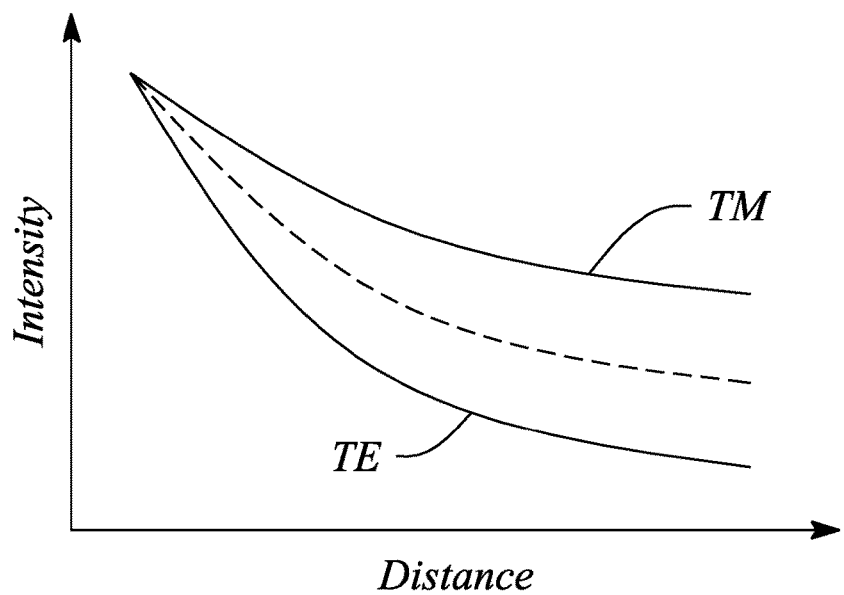
FIG. 1 illustrates a graph of light intensity within a leaky light guide as a function of distance along a propagation axis of the light, according to an example of the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide polarization mixing in a light guide with application to electronic display backlighting, for example. In particular, in accordance with the principles described herein, polarization mixing provides redistribution of light of or associated with polarization components of a guided light beam within the light guide. Further, the polarization component light redistribution is provided as a function of distance along the light guide, as described herein. In some examples, the redistribution may substantially exchange or interchange light between various polarization components, e.g., between a transverse electric (TE) polarization component and a transverse magnetic (TM) polarization component. By redistributing light associated with the polarization components (e.g., periodically along the light guide length), a more uniform distribution of the light in the guided light beam may be achieved within and along the light guide. In particular, a more uniform distribution may be provided especially when light predominately associated with a particular polarization component (e.g., a first or TE polarization component) is preferentially scattered, coupled out or otherwise is configured to 'leak' from the light guide along a length thereof.

For example, light may propagate within a light guide (e.g., a plate light guide) in a collimated fashion or equivalently as a collimated beam of light in which a direction of rays of the guided light are well defined. Further, the light guide may preferentially scatter out light associated with a particular polarization component of the collimated guided light beam, in some examples. For example, a 'scatterer' or 'scattering center' (e.g., a multibeam diffraction grating, described below) that provides preferential scattering of the particular polarization component may be present either within the light guide or at a surface thereof. In particular, the scattering center may be an anisotropic scatterer with a scattering strength that depends on the polarization of light incident on the scattering center. Light polarized along a first of two polarization axes (i.e., a first polarization component) may be preferentially or 'maximally' scattered by the scattering center, while light polarized along a second of the two polarization axes (i.e., a second polarization component) may be minimally scattered by the scattering center, for example. As a result, a proportion of the collimated guided light beam in the light guide associated with the first polarization component will diminish at a rate greater than a proportion of the collimated guided light beam associated with the second polarization component as a function of distance along the light guide due to the preferential scattering.

According to various examples, polarization mixing within the light guide may be employed to redistribute light of the guided light beam associated with the polarization components (or equivalently 'to redistribute the polarization components'). The light redistribution may mitigate the effects of the preferential scattering, according to various examples. In particular, polarization mixing may be used to redistribute a portion of the light associated with the second (i.e., minimally scattered) polarization component into the first polarization component to effectively 'replenish' the preferentially scattered polarization component (i.e., the first polarization component). Moreover, in some examples, the polarization mixing may substantially interchange light associated with the first and second polarization components. For example, the first polarization component may be a transverse electric (TE) polarization component, while the second polarization component may be a transverse magnetic (TM) polarization component. Light redistribution by or using polarization mixing may result in the exchange or interchange of the TE and TM polarization components, according to some examples. Moreover, the polarization component light redistribution (or equivalently 'polarization component redistribution') provided by polarization mixing may be repeated (e.g., be periodic) along a length of the light guide, according to some examples. Polarization mixing may be used to redistribute, and in some examples, interchange (e.g., periodically interchange), the first and second components of the guided light within the light guide to facilitate better utilization of the guided light, for example, by multibeam diffractive gratings of an electronic display backlight, according to some examples.

FIG. 1 illustrates a graph of light intensity within a leaky light guide as a function of distance along a propagation axis of the light, according to an example of the principles described herein. In particular, intensity of a first polarization component labeled 'TE' and intensity of a second polarization component labeled 'TM' of light are illustrated as a function of distance or equivalently as a function of distance along an optical path of a guided light beam within the light guide. Further, light guided (e.g., as the guided light beam) within the light guide of FIG. 1 is configured to be scattered, coupled or otherwise leaked out along a length of the light guide, for example, with the first or TE polarization component of the guided light beam being preferentially coupled out compared to the second or TM polarization component. As illustrated in FIG. 1, the intensities of both the TE polarization component and the TM polarization component decay exponentially as a result of the outcoupling of the light of the guided light beam. However, since the TE polarization component is preferentially coupled out, the intensity of the TE polarization component decays more rapidly than the TM polarization component intensity. In some examples, such as in an electronic display backlight that employs multibeam diffractive gratings to couple light out of the light guide, the coupled out light may be predominantly associated with the TE polarization component of the guided light beam. The relative intensity of the TE and TM polarization components in such an electronic display backlight using multibeam diffraction gratings is observed to decay as illustrated in FIG. 1, for example.

Also illustrated in FIG. 1, as a dashed line, is an example of the effect of polarization mixing on guided light intensity as a function of distance along the light guide, according to an example of the principles described herein. In particular, as illustrated, polarization mixing periodically redistributes (e.g., interchanges) the TE and TM polarization components of the guided light beam as the guided light beam travels down the light guide length. As a result of polarization mixing, a decay of light intensity (e.g., of both the TE and TM polarization components of the guided light beam) may follow the dashed curve illustrated in FIG. 1 instead of the individual curves associated with either of the two separate polarization components (i.e., the TE and TM polarization component curves). In other words, both the TE and TM polarization components as illustrated by the dashed line/curve may effectively decay at a rate that is about an 'average' of the two separate polarization components due to polarization mixing. As such, a more uniform distribution of the guided light intensity is achieved within and along the light guide using polarization mixing, according to various examples of the principles described herein.

According to various examples, polarization mixing is used in conjunction with light that is guided as a beam of light within a plate light guide. Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may include, but is not limited to, one of a plate or slab guide, a strip guide, and a combination thereof.

Further herein, the term 'plate' when applied to a light guide as in a 'plate light guide' is defined as a piece-wise or differentially planar layer or sheet. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and substantially parallel to one another in a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

According to some examples described herein, a diffraction grating (e.g., a multibeam diffraction grating) may be employed to scatter or couple light out of a plate light guide. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., a diffractive angle). In particular, as a result of diffraction, light leaving the diffraction grating (i.e., diffracted light) generally has a different propagation direction than a propagation direction of the incident light on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (e.g., a boundary between two materials). The surface may be a surface of a plate light guide, for example. The diffractive features may include any of a variety of structures that diffract light including, but not limited to, one or more of grooves, ridges, holes and bumps at, in or on the surface. For example, the diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. For example, the light beam plurality may include eight light beams that have eight different principal angular directions. The eight light beams in combination (i.e., the light beam plurality) may represent a light field, for example. According to various examples, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various examples described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3-D) electronic display (e.g., also referred to as a multiview or 'holographic' electronic display or an autostereoscopic display). As such, the differently directed light beams produced by coupling out guided light from the light guide using the multibeam diffractive grating may be or represent 'pixels' of the 3-D electronic display. Moreover, the differently directed light beams may form a light field, according to various examples.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 2A:
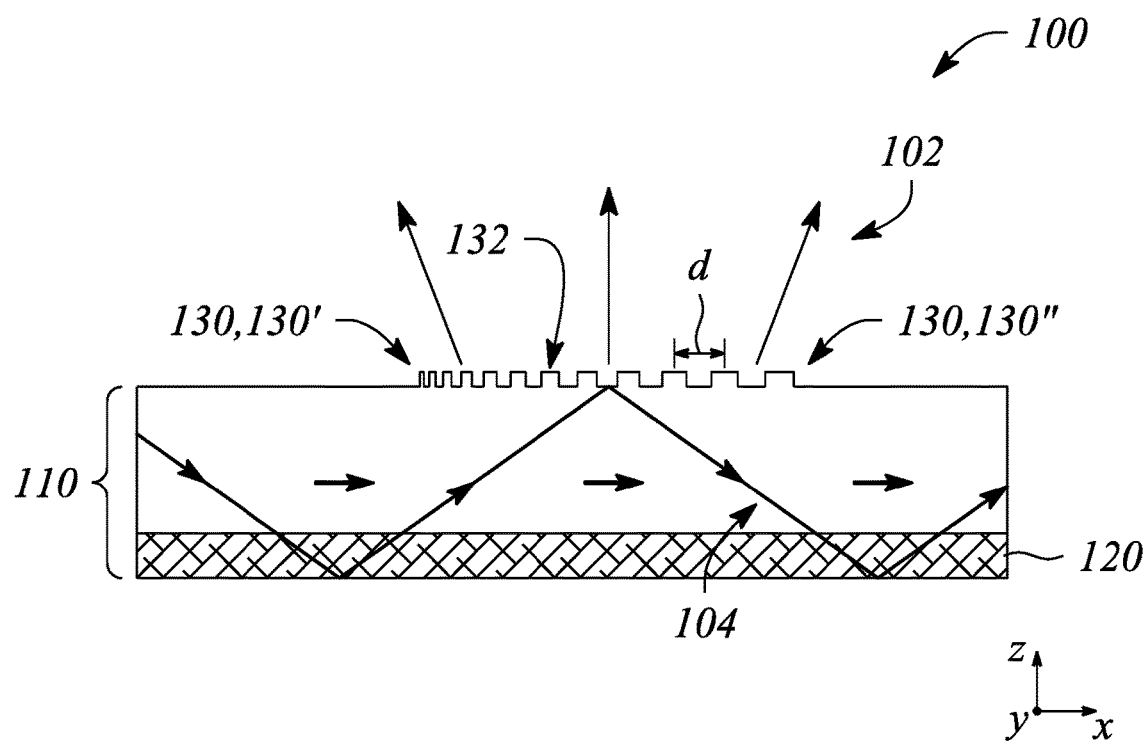
FIG. 2A illustrates a cross sectional view of a polarization-mixing light guide, according to an example consistent with the principles described herein.
Figure 2B:
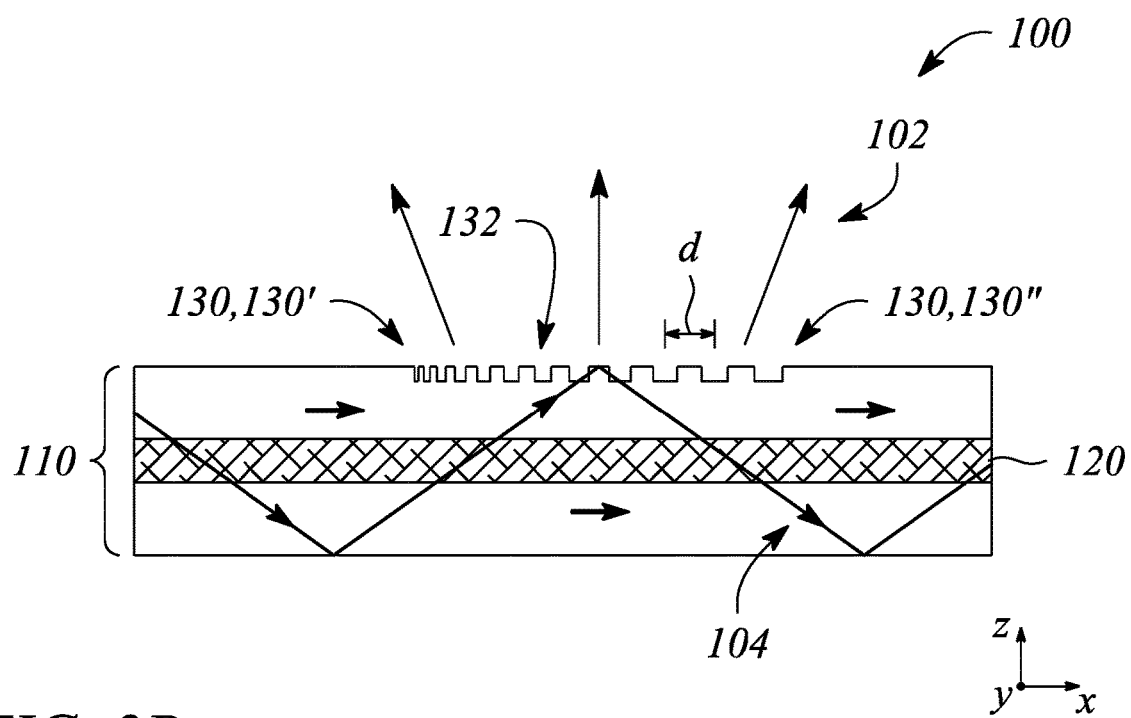
FIG. 2B illustrates a cross sectional view of a polarization-mixing light guide, according to another example consistent with the principles described herein.

In accordance with some examples of the principles described herein, a polarization-mixing light guide is provided. FIG. 2A illustrates a cross sectional view of a polarization-mixing light guide 100, according to an example consistent with the principles described herein. FIG. 2B illustrates a cross sectional view of a polarization-mixing light guide 100, according to another example consistent with the principles described herein. The polarization-mixing light guide 100 employs polarization mixing to redistribute polarization components of light guided within the polarization-mixing light guide 100. In particular, polarization mixing within the polarization-mixing light guide 100 may facilitate a more even and consistent distribution of polarization components of the guided light along an optical path of the polarization-mixing light guide 100 than is provided in a similar light guide without polarization mixing. For example, when light of a guided light beam associated with a selected polarization component (e.g., a first polarization component) is preferentially scattered out of the polarization-mixing light guide 100 (e.g., as light beams 102, described below), the polarization mixing may facilitate a more even and consistent light distribution within and along the polarization-mixing light guide 100.

As illustrated, the polarization-mixing light guide 100 includes a light guide 110. In particular, the light guide 110 is a plate light guide 110, according to various examples. The plate light guide 110 is configured to guide light (e.g., from a light source) as a beam of light along a length of the plate light guide 110. Further, the plate light guide 110 is configured to guide the beam of light (i.e., a guided light beam 104) at a non-zero propagation angle, according to various examples. As defined herein, the non-zero propagation angle is an angle relative to a surface (e.g., a top surface or a bottom surface) of the plate light guide 110.

In some examples, the non-zero propagation angle of the guided light beam may be between about ten (10) degrees and about fifty (50) degrees. In some examples, the non-zero propagation angle of the guided light beam may be between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, light from a light source may be introduced or coupled into the plate light guide 110 at the non-zero propagation angle (e.g., of about 30-35 degrees). One or more of a lens, a mirror or similar reflector (e.g., a tilted collimating reflector, and a prism (not illustrated)) may facilitate coupling light into an input end of the plate light guide 110 as the beam of light at the non-zero propagation angle, for example. Once coupled into the plate light guide 110, the guided light beam 104 then propagates along the plate light guide 110 in a direction that is generally away from the input end. Further, the guided light beam 104 propagates at the non-zero propagation angle within the plate light guide 110. In particular, the plate light guide 110 is configured to guide light by reflecting or 'bouncing' the guided light beam 104 between the top surface and the bottom surface of the plate light guide 110 as the guided light beam 104 propagates along the plate light guide 110.

Further, the guided light beam 104 produced by coupling light into the plate light guide 110 may be a collimated light beam, according to various examples. In particular, by 'collimated' it is meant that rays of light within the guided light beam 104 are substantially parallel to one another within the guided light beam 104. Rays of light that diverge or are scattered from the guided light beam 104 are not considered to be part of the collimated guided light beam 104, by definition herein. Collimation of the light to produce the collimated guided light beam 104 may be provided by the lens or mirror (e.g., tilted collimating reflector, etc.) used to couple the light into the plate light guide 110, for example.

As illustrated in FIGS. 2A and 2B, the guided light beam 104 propagates along the plate light guide 110 in a generally horizontal direction (e.g., as a collimated light beam). A general propagation of the guided light beam 104 is illustrated from left to right in FIGS. 2A and 2B as bold horizontal arrows pointing along an x-axis. Moreover, a light ray of the propagating guided light beam 104 (e.g., a central ray) is represented as an extended, angled arrow within the plate light guide 110, for example. The guided light beam 104 may represent one or more optical modes of light within the plate light guide 110, for example. Further, as illustrated, the guided light beam 104 propagates in the general propagation direction by 'bouncing' or reflecting off of walls (e.g., top or front and bottom or back surfaces) of the plate light guide 110 at an interface between the material (e.g., dielectric) of the plate light guide 110 and the surrounding medium due to total internal reflection.

In some examples, the plate light guide 110 may be a slab or plate optical waveguide comprising an extended, substantially planar sheet of optically transparent material, such as a dielectric material. The substantially planar sheet of dielectric material is configured to guide the guided light beam 104 using total internal reflection. According to various examples, the optically transparent material of the plate light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 110 may further include a cladding layer on at least a portion of a surface (e.g., one or both of the top surface and the bottom surface) of the plate light guide 110 (not illustrated). The cladding layer may be used to further facilitate total internal reflection, according to some examples.

According to various examples, the guided light beam 104 has a first polarization component and a second polarization component. The first and second polarization components may be substantially orthogonal to one another, according to various examples. In some examples, the first polarization component is a transverse electric (TE) polarization component and the second polarization component is a transverse magnetic (TM) polarization component.

In some examples, the guided light beam 104 may be initially coupled into the plate light guide 110 as substantially unpolarized, or equivalently 'randomly polarized,' light. In another example, the guided light beam 104 may have an arbitrary polarization when coupled into the plate light guide 110. As such, a portion of the guided light beam 104 may be viewed as being associated with, or equivalently as being, the first polarization component. Similarly, another portion of the guided light beam 104 may be viewed as being associated with, or equivalently as being, the second polarization component of the guided light beam 104. Together the light portions or the first and second polarization components in combination make up the guided light beam 104, according to various examples. In particular, the guided light beam 104 may be represented by a superposition of the two orthogonal polarization components (e.g., the first and the second polarization components), according to some examples.

In some examples, a characteristic (e.g., intensity, quantity, level etc.) of the first portion of the guided light beam 104 corresponding to or associated with the first polarization component may be about equal to a characteristic (e.g., intensity, etc.) of the second portion of the guided light beam 104 corresponding to or associated with the second polarization component within the plate light guide 110, in particular, in a vicinity of the input end of the plate light guide 110. In other words, light of the substantially unpolarized or arbitrarily polarized guided light beam 104 at the input end of the plate light guide 110 may be about equally distributed between the first and second polarization components (e.g., the TE and TM polarization components). In other examples, either the characteristic of the first polarization component portion of the guided light beam 104 is greater than the second polarization component portion or the characteristic of the second polarization component portion is greater than the first polarization component portion.

As illustrated in FIGS. 2A and 2B, the polarization-mixing light guide 100 further includes a polarization retarder 120 within the plate light guide 110. The polarization retarder 120 is configured to redistribute the first polarization component and the second polarization component of the guided light beam 104 into linear combinations of the first and second polarization components. The redistribution may interchange the first and second polarization components of the guided light beam 104, according to some examples.

In particular, as the guided light beam 104 passes through the polarization retarder 120 at the non-zero propagation angle, the polarization retarder 120 is configured to redistribute light (or the light portion) of the guided light beam 104 associated with the first polarization component into a predetermined linear combination of the first polarization component and the second polarization component. In addition, the polarization retarder 120 is configured to redistribute light (or the light portion) of the guided light beam 104 associated with the second polarization component into another predetermined linear combination of the first and second polarization components. For example, if the first polarization component is the TE polarization component ($e_{TE}$) and the second polarization component is the TM polarization component ($e_{TM}$), the polarization retarder 120 may redistribute the light portion associated with the TE polarization component $e_{TE}$ into a linear combination of the TE and TM polarization components (e.g., $e_{TE} \rightarrow a \cdot e_{TE} + b \cdot e_{TM}$, where a, b are integers between 0 and 1, such that $|a|^2+|b|^2=1$). Similarly, the polarization retarder 120 may redistribute the light portion associated with the TM polarization component $e_{TM}$ into another linear combination of the TE and TM polarization components (e.g., $e_{TM} \rightarrow c \cdot e_{TE} + d \cdot e_{TM}$, where c, d are integers between 0 and 1, such that $|c|^2+|d|^2=1$), for example.

In some examples, the light redistribution provided by the polarization retarder 120 may interchange or at least substantially interchange the first and second polarization components of the guided light beam 104. By 'interchange' it is meant that a portion of the guided light beam 104 corresponding to light associated with the first polarization component is effectively 'transformed' into the second polarization component, while a portion of the guided light beam 104 corresponding to light associated with the second polarization component is effectively 'transformed' into the first polarization component. For example, if the linear combinations result in all of the TE polarization component $e_{TE}$ being redistributed into only the TM polarization component $e_{TM}$ and all of the TM polarization component $e_{TM}$ being redistributed into only the TE polarization component $e_{TE}$ (e.g., |a|=0; |b|=1 and |c|=0; |d|=1), then the TE and TM polarization components are interchanged. In other words, the polarization retarder 120 substantially exchanges the first polarization component and the second polarization components of the guided light beam 104 with one another.

Examples of polarization retarders 120 include, but are not limited to, various birefringent crystals (e.g., mica, calcite, quartz, etc.), birefringent polymers, and liquid crystal retarders. In some examples, the polarization retarder 120 may be a uniaxial retarder, while in other examples, a multi-axial retarder may be employed.

In some examples, the polarization retarder 120 may act as a 'half-wave' plate. That is, a total optical path length of the guided light beam 104 through the polarization retarder 120 at the non-zero propagation angle is configured to introduce about a one-half wavelength differential phase delay between a linear superposition of the polarization components of the guided light beam 104. For example, the one-half wavelength differential phase delay may be a phase delay or difference between a linear superposition of a first polarization component $e_1$ given by equation (1) and a second polarization component $e_2$ given by equation (2), for example.

$$e_1 = \frac{1}{\sqrt{2}}(e_{TE} + e_{TM}) \quad (1)$$

$$e_2 = \frac{1}{\sqrt{2}}(e_{TE} - e_{TM}) \quad (2)$$

where $e_{TE}$ and $e_{TM}$ are the TE and TM polarization components, respectively. The differential phase delay of about one-half wavelength substantially interchanges the first (e.g., TE) polarization component and the second (e.g., TM) polarization component at an output or exit point of the polarization retarder 120, according to various examples.

In some examples (e.g., as illustrated in FIGS. 2A and 2B), the polarization retarder 120 comprises a polarization retarder film or layer. For example, the polarization retarder 120 may comprise a polymer film or layer having birefringence configured to provide the aforementioned differential phase delay of the first and second polarization components or equivalently to provide the aforementioned redistribution of the light associated respectively with the first and second polarization components. In some examples, the polarization retarder 120 may comprise a uniaxial retarder film (e.g., a polymer uniaxial retarder film). In some examples, polarization retarder material of the polarization retarder 120 is provided adjacent to, embedded in or surrounded by the light guide dielectric material. As a layer of the polarization retarder material, the polarization retarder 120 may be a continuous layer or a discontinuous layer (e.g., islands of the material distributed with the light guide), which is coplanar with the plate light guide, for example.

In some examples, the polarization retarder 120 may comprise a layer or film (e.g., a 'polarization retarder layer' 120) adjacent to a surface of the plate light guide 110. For example, the polarization retarder layer 120 may be adjacent to either a back surface or a front surface of the plate light guide 110. Further, the polarization retarder layer 120 may be adjacent to a surface of the plate light guide 110 opposite to the plate light guide surface from which light is scattered out of the plate light guide 110 (e.g., as light beams 102, as further described below), in some examples. For example, as illustrated in FIG. 2A, the polarization retarder layer 120 is adjacent to a back surface of the plate light guide 110 which is opposite to a front surface of the plate light guide 110 from which the light beams 102 are scattered (e.g., by a multibeam diffraction grating, described below). In other examples, the polarization retarder layer 120 may be located within the plate light guide 110 between but spaced apart from both the front surface and the back surface of the plate light guide 110, as illustrated in FIG. 2B.

In some examples, the polarization retarder layer 120 is substantially coplanar with the plate light guide 110. For example, the polarization retarder layer 120 may be a layer formed on or applied to the back surface of the plate light guide 110 (e.g., as in FIG. 2A). In another example, the polarization retarder layer 120 may be positioned within the plate light guide 110 such that a surface of the polarization retarder layer 120 (e.g., a top surface) is substantially parallel with but spaced apart from a surface (e.g., the top surface) of the plate light guide 110 (e.g., as in FIG. 2B). For example, the polarization retarder layer 120 may be laminated, glued or otherwise affixed between two other layers that, along with the polarization retarder layer 120, form the plate light guide 110. As such, the substantially parallel-positioned polarization retarder layer 120 within the plate light guide 110 is, by definition, coplanar with the plate light guide 110. In other examples, the polarization retarder layer 120 may be located within plate light guide 110 at an angle with respect to one or both of the plate light guide surfaces and thus, the polarization retarder layer 120 is substantially not coplanar with the plate light guide 110.

In yet other examples, the plate light guide 110 itself may be the polarization retarder 120. For example, the polarization retarder 120 may be implemented as a plurality of polarization retarder regions or blocks distributed along and within the plate light guide 110. The polarization retarder regions that make up the polarization retarder 120 may be located periodically along the length of the plate light 110, for example. In another example, the plate light guide 110 comprises a material that exhibits birefringence such that the plate light guide 110 itself or a substantial portion thereof becomes the polarization retarder 120, for example.

Figure 3:
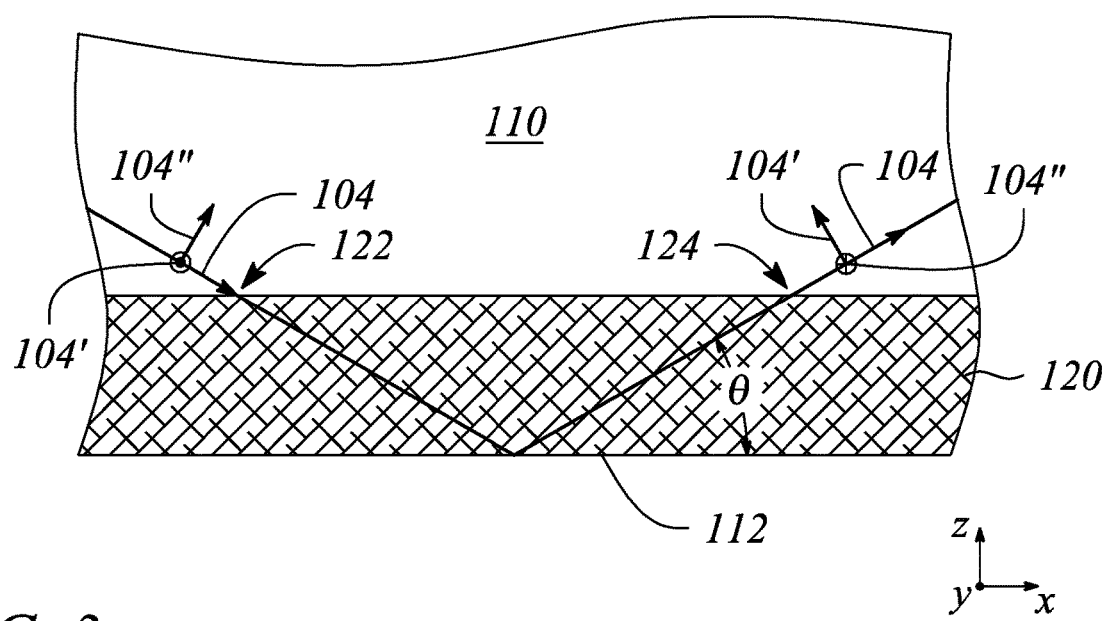
FIG. 3 illustrates a cross sectional view of a portion of a polarization-mixing light guide, according to an example consistent with the principles described herein.

FIG. 3 illustrates a cross sectional view of a portion of a polarization-mixing light guide 100, according to an example consistent with the principles described herein. In particular, the cross sectional view of FIG. 3 illustrates an example of a portion of the plate light guide 110 including the polarization retarder layer 120 adjacent to a back surface 112 of the plate light guide 110 of the polarization-mixing light guide 100. The polarization-mixing light guide portion illustrated in FIG. 3 may be a portion of the polarization-mixing light guide 100 illustrated in FIG. 2A, for example. Note that, in this example, a back surface of the polarization retarder layer 120 corresponds to or is collocated with a back surface 112 of the plate light guide 110, as illustrated.

The guided light beam 104 within the plate light guide 110 is illustrated as a vector directed in a propagation direction (from left to right) and with the non-zero propagation angle denoted as 'θ'. The vector may correspond to a principal Poynting vector of the guided light beam 104, for example. As illustrated, the non-zero propagation angle θ is about 30 degrees, for example. Further illustrated are a first vector (illustrated as a circle with a dot in the middle to represent a vector that is parallel to a top surface of the polarization retarder layer 120 and pointing out of the page) that represents a first polarization component 104' and a second vector that represents a second polarization component 104" of the guided light beam 104, orthogonal to the first polarization component 104' before entering the polarization retarder 120. The first and second polarization components 104', 104" are orthogonal to one another as well as being orthogonal to the principal Poynting vector of the guided light beam 104, as illustrated in FIG. 3. At an input or entry location 122 of the polarization retarder layer 120, the first polarization component 104' may correspond to the TE polarization component of the guided light beam 104, while the second polarization component 104" may correspond to the TM polarization component of the guided light beam 104, for example.

As illustrated in FIG. 3, the guided light beam 104 passes through the polarization retarder layer 120 in a first direction until the back surface 112 of the plate light guide 110 is encountered. At the back surface 112, the guided light beam 104 is reflected by total internal reflection and then passes through the polarization retarder layer 120 a second time. The guided light beam 104 exits at an output or exit location 124 of the polarization retarder layer 120. Note that the guided light beam 104 effectively passes through the polarization retarder layer 120 twice, as illustrated. Thus, the guided light beam 104 makes a 'round trip' through the polarization retarder layer 120 from the entry location 122 to the exit location 124 of the polarization retarder layer 120.

During the round trip, the polarization retarder layer 120 redistributes the light associated with the first and second polarization components 104', 104", as is described above. In particular, as illustrated, the polarization retarder layer 120 rotates the guided light polarization such that the second polarization component 104" exits the polarization retarder layer 120 parallel with the top surface of the polarization retarder layer 120 (a vector illustrated as a circle with a + in the middle to represent a direction into the page); and the first polarization component 104' exits pointing away from the top surface of the polarization retarder layer 120, as a vector orthogonal to the second polarization component 104" in FIG. 3.

Thus, at the exit location 124 of the polarization retarder layer 120, the first polarization component 104' now corresponds to or has been effectively transformed into the second polarization component of the guided light beam 104, while the second polarization component 104" now corresponds or has been effectively transformed into the first polarization component 104' of the guided light beam 104 (i.e., the guided light beam 104 has undergone a 180-degree polarization rotation). In other words, the first and second polarization components 104', 104" of the guided light beam 104 have been interchanged by the round trip passage through the polarization retarder 120 and the light redistribution associated therewith, as illustrated in FIG. 3.

For example, the polarization retarder layer 120 may be a uniaxial birefringent material layer having an extraordinary or slow axis characterized by an extraordinary refractive index $n_e$ and an ordinary or fast axis characterized by an ordinary refractive index $n_o$, where the fast axis is orthogonal to the slow axis. Further, with reference to the example illustrated in FIG. 3, the slow axis may be rotated by an angle φ relative to the propagation direction of the guided light beam 104 (i.e., along an x-direction) in a plane of the top surface of the polarization retarder layer 120 (e.g., an x-y plane of FIG. 3). For the guided light beam 104 with the non-zero propagation angle θ, as illustrated in FIG. 3, and the polarization components $e_1$, $e_2$ given in equations (1) and (2) above, if the rotation angle φ of the polarization retarder layer 120 is chosen such that tangent φ is equal to sine θ (i.e., tan(φ)=sin(θ), a round trip differential phase delay δ may be given by equation (3) as $$\delta = 2t\left(\sqrt{n_1^2 - n_o^2 \cos^2(\theta)} - \sqrt{n_2^2 - n_o^2 \cos^2(\theta)}\right) \quad (3)$$

where $$n_1 = n_o \text{ and } \frac{1}{n_2} = \frac{1}{n_o^2}\left(\frac{1-\sin^2(\theta)}{1+\sin^2(\theta)}\right) + \frac{1}{n_e^2}\left(\frac{2\sin(\theta)}{1+\sin^2(\theta)}\right)$$

and where t is a thickness of the polarization retarder layer 120 in the z-direction. If the rotation angle φ is chosen such that the round trip differential phase delay δ is equal to a wavelength λ divided by two (δ=λ/2) then the polarization components $e_1$, $e_2$ will be interchanged by the round trip through the polarization retarder layer 120 of FIG. 3, according to some examples.

According to some examples of the principles described herein, the polarization-mixing light guide 100 may be, may be comprised in, or may serve as a multibeam grating-based backlight configured to provide or generate a plurality of light beams 102 directed out and away from the polarization-mixing light guide 100. Further, the light beams 102 are directed out and away in different predetermined directions, according to various examples. In some examples, the plurality of light beams 102 having different directions may form a plurality of pixels of an electronic display. Moreover, in some examples, the electronic display is a so-called 'glasses free' three-dimensional (3-D) electronic display (e.g., a multiview display). In particular, the light beams 102 of the plurality may form a light field that supports the display of 3-D information.

In particular, a light beam 102 of the light beam plurality may be configured to have a different principal angular direction from other light beams 102 of the light beam plurality (e.g., see FIGS. 2A-2B), according to various examples. Further, the light beam 102 may have a relatively narrow angular spread. As such, the light beam 102 may be directed away from the multibeam grating-based backlight in a direction that is substantially established by the principal angular direction of the light beam 102. In some examples, the light beams 102 may be individually modulated (e.g., by a light valve as described below). The individual modulation of the light beams 102 directed in different directions away from the multibeam diffraction grating-based backlight may be particularly useful for 3-D electronic display applications, for example.

Referring again to FIGS. 2A-2B, the polarization-mixing light guide 100 serving as the multibeam diffraction grating-based backlight further includes a multibeam diffraction grating 130. According to various examples (e.g., as illustrated in FIGS. 2A-2B), the multibeam diffraction grating 130 is located at a surface of the plate light guide 110 (e.g., a front surface) and is configured to scatter or diffractively couple out a portion or portions of the guided light beam 104 from the plate light guide 110 by or using diffractive coupling. In particular, the coupled-out portion of the guided light beam 104 is diffractively redirected away from the plate light guide surface as the plurality of light beams 102. As discussed above, each of the light beams 102 of the plurality has a different principal angular direction (e.g., such that the light beam plurality forms a light field). Further, the light beams 102 are diffractively redirected away from the plate light guide surface at or on which the multibeam diffraction grating 130 is located, according to various examples.

In general, the light beams 102 produced by the multibeam diffraction grating 130 may be either diverging or converging (not illustrated), according to various examples. In particular, FIGS. 2A-2B illustrate light beams 102 of the plurality that are diverging. Whether the light beams 102 are diverging or converging is determined by a propagation direction of the guided light beam 104 relative to a characteristic of the multibeam diffraction grating 130 (e.g., a chirp direction). In some examples where the light beams 102 are diverging, the diverging light beams 102 may appear to be diverging from a 'virtual' point (not illustrated) located some distance below or behind the multibeam diffraction grating 130. Similarly, the converging light beams may converge or cross at a virtual point (not illustrated) above or in front of the multibeam diffraction grating 130 (e.g. the plate light guide front surface), according to some examples.

As further illustrated in FIGS. 2A-2B, the multibeam diffraction grating 130 includes a plurality of diffractive features 132 configured to provide diffraction. The provided diffraction is responsible for the diffractive coupling of the guided light beam 104 out of the plate light guide 110. For example, the multibeam diffraction grating 130 may include one or both of grooves in a surface of the plate light guide 110 (e.g., as illustrated in FIG. 2B) and ridges protruding from the plate light guide surface (e.g., as illustrated in FIG. 2A) that serve as the diffractive features 132. The grooves and ridges may be arranged parallel to one another and, at least at some point along the diffractive features 132, perpendicular to a propagation direction of the guided light beam 104 that is to be coupled out by the multibeam diffraction grating 130.

In some examples, the grooves and ridges may be etched, milled or molded into the surface or applied on the surface. As such, a material of the multibeam diffraction grating 130 may include a material of the plate light guide 110. As illustrated in FIG. 2A, for example, the multibeam diffraction grating 130 includes substantially parallel ridges that protrude from the surface of the plate light guide 110. In FIG. 2B, the multibeam diffraction grating 130 includes substantially parallel grooves 132 that penetrate the surface of the plate light guide 110. In other examples (not illustrated), the multibeam diffraction grating 130 may be a film or layer deposited, applied or affixed to the light guide surface.

The multibeam diffraction grating 130 may be arranged in a variety of configurations at, on or in the surface of the plate light guide 110, according to various examples. For example, the multibeam diffraction grating 130 may be a member of a plurality of gratings (e.g., multibeam diffraction gratings) arranged in columns and rows across the light guide surface. The rows and columns of multibeam diffraction gratings 130 may represent a rectangular array of multibeam diffraction gratings 130, for example. In another example, the plurality of multibeam diffraction gratings 130 may be arranged as another array including, but not limited to, a circular array. In yet another example, the plurality of multibeam diffraction gratings 130 may be distributed substantially randomly across the surface of the plate light guide 110.

According to some examples, the multibeam diffraction grating 130 may include a chirped diffraction grating 130. By definition, the 'chirped diffraction grating' 130 is a diffraction grating exhibiting or having a diffraction pitch or spacing d of the diffractive features that varies across an extent or length of the chirped diffraction grating 130, as illustrated in FIGS. 2A-2B. Herein, the varying diffraction spacing d is referred to as a 'chirp'. As a result, the guided light beam 104 that is diffractively coupled out of the plate light guide 110 exits or is emitted from the chirped diffraction grating 130 as the light beam 102 at different diffraction angles corresponding to different points of origin of respective ones of the light beam 102 across the chirped diffraction grating 130. By virtue of the chirp, the chirped diffraction grating 130 may produce the plurality of light beams 102 having different principal angular directions.

In some examples, the chirped diffraction grating 130 may have or exhibit a chirp of the diffractive spacing d that varies linearly with distance. As such, the chirped diffraction grating 130 may be referred to as a 'linearly chirped' diffraction grating. FIGS. 2A-2B illustrate the multibeam diffraction grating 130 as a linearly chirped diffraction grating, for example. In particular, as illustrated, the diffractive features 132 are closer together at a first end 130' of the multibeam diffraction grating 130 than at a second end 130". Further, the diffractive spacing d of the illustrated diffractive features 132 varies linearly from the first end 130' to the second end 130".

In some examples, as mentioned above, the light beams 102 produced by coupling the guided light beam 104 out of the plate light guide 110 using the multibeam diffraction grating 130 may diverge (i.e., be diverging light beams 102 ) when the guided light beam 104 propagates in a direction from the first end 130' to the second end 130" (e.g., as illustrated in FIGS. 2A-2B). Alternatively, converging light beams 102 may be produced when the guided light beam 104 propagates from the second end 130" to the first end 130' (not illustrated), according to other examples.

In another example (not illustrated), the chirped diffraction grating 130 may exhibit a non-linear chirp of the diffractive spacing d. Various non-linear chirps that may be used to realize the chirped diffraction grating 130 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle (or sawtooth) chirp, may also be employed.

Figure 4:
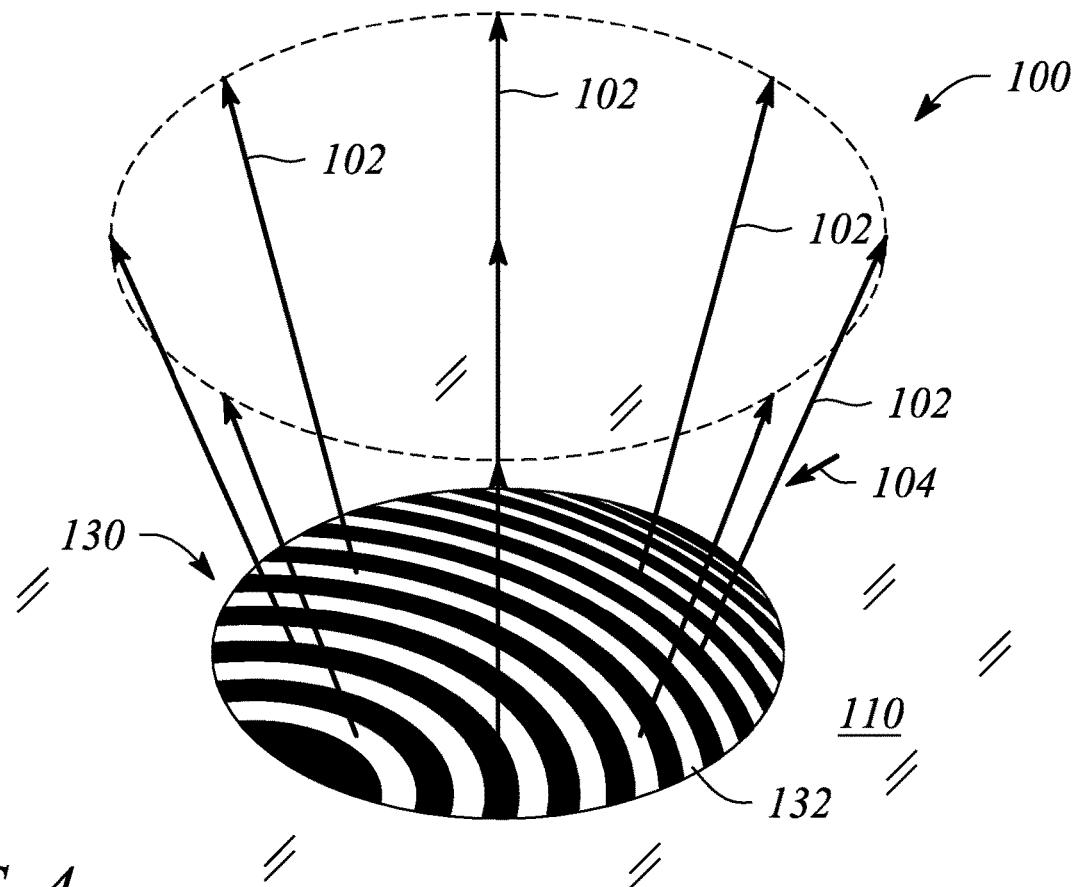
FIG. 4 illustrates a perspective view of a portion of a surface of the polarization-mixing light guide illustrated in either of FIG. 2A or 2B, according to an example consistent with the principles described herein.

FIG. 4 illustrates a perspective view of a portion of a surface of a polarization-mixing light guide 100 illustrated in either of FIGS. 2A or 2B, according to an example consistent with the principles described herein, that includes a multibeam diffraction grating 130. In particular, FIG. 4 illustrates a perspective view of the multibeam diffraction grating 130 of FIGS. 2A-2B. As illustrated, the multibeam diffraction grating 130 including diffractive features 132 (e.g., grooves or ridges) that are both curved and chirped (i.e., the multibeam diffraction grating 130 is a curved, chirped diffraction grating) in or on a surface of the plate light guide 110. The guided light beam 104 has an incident direction relative to the multibeam diffraction grating 130 and the plate light guide 110 as illustrated in FIG. 4, by way of example. FIG. 4 also illustrates the plurality of emitted light beams 102 pointing away from the multibeam diffraction grating 130 at the surface of the plate light guide 110. As illustrated, the light beams 102 are emitted in a plurality of different principal angular directions. In particular, the different principal angular directions of the emitted light beams 102 are different in both azimuth and elevation, as illustrated. As discussed above, both the chirp of the diffractive features 132 and the curve of the diffractive features 132 may be responsible for the different principle angular directions of the emitted light beams 102.

According to various examples, the multibeam diffraction grating 130 may preferentially scatter or couple out a portion of the guided light beam 104 associated with the first polarization component relative to a second polarization component. For example, the multibeam diffraction grating 130 may preferentially couple out or scatter out a light portion of the guided light beam 104 associated with the TE polarization component about three times (3×) more than a light portion of the guided light beam 104 associated with the TM polarization component. The preferential scattering or coupling out of one polarization component (e.g., the TE polarization component) when compared to another polarization component (e.g., the TM polarization component) may result in a change in a relative level or intensity of each of the polarization components of the guided light beam 104 remaining within the plate light guide 110 after encountering the multibeam diffraction grating 130. By a change in a relative 'level', it is meant that a relative amount of intensity, a relative power or a relative energy of the polarization components is changed. The polarization mixing provided by the polarization retarder 120, described above, may mitigate the effects of this change in relative levels of the polarization components, according to various examples.

For example, after the multibeam diffraction grating 130 has preferentially coupled out more of the first or TE polarization component of the guided light beam 104, the level of the TE polarization component of the guided light beam 104 remaining can be effectively 'replenished' with more TE polarization component by redistributing (e.g., interchanging) some of the TM polarization component into the TE polarization component using the polarization retarder 120, as described above. The polarization mixing serves to effectively increase the level of the TE polarization component at the expense of the TM polarization component, according to various examples. As such, a greater portion of the remaining guided light beam 104 will correspond to the TE polarization component as or after the guided light beam 104 makes the round trip through the polarization retarder 120. The remaining guided light beam 104 may have a greater portion of light associated with the TE polarization component available to be coupled out by a subsequent diffractive coupling by the multibeam diffraction grating 130 than without polarization mixing, for example. The same may be true for any two arbitrary polarization components that are redistributed or interchanged by polarization mixing in the plate light guide 110, according to various examples.

According to some examples of the principles described herein, an electronic display is provided. The electronic display is configured to emit modulated light beams as pixels of the electronic display. Further, in various examples, the modulated, light beams may be preferentially directed toward a viewing direction of the electronic display as a plurality of differently directed, modulated light beams. In some examples, the electronic display is a three-dimensional (3-D) electronic display (e.g., a glasses-free, 3-D electronic display). Different ones of the modulated, differently directed light beams correspond to different 'views' associated with the 3-D electronic display, according to various examples. The different 'views' may provide a 'glasses free' (e.g., autostereoscopic or holographic) representation of information being displayed by the 3-D electronic display, for example.

Figure 5:
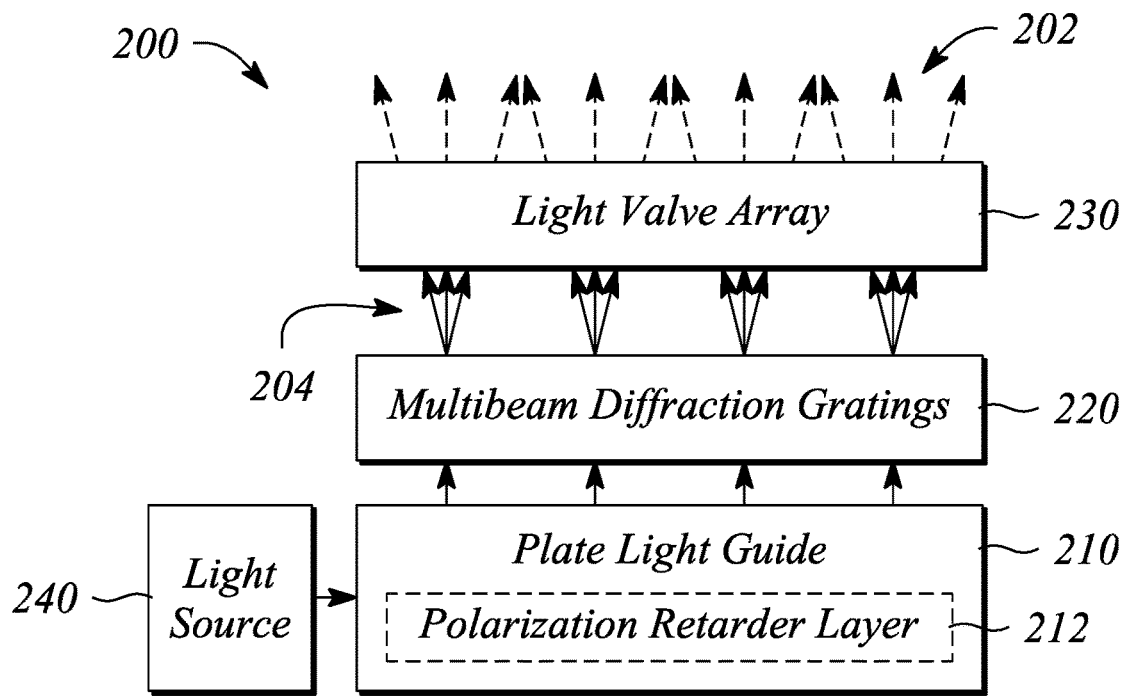
FIG. 5 illustrates a block diagram of a 3-D electronic display, according to an example consistent with the principles described herein.

FIG. 5 illustrates a block diagram of a 3-D electronic display 200, according to an example consistent with the principles described herein. The 3-D electronic display 200 illustrated in FIG. 5 includes a plate light guide 210 to guide light as a beam of light. The beam of light may be collimated, for example. The guided light beam in the plate light guide 210 is a source of the light that becomes the modulated light beams 202 emitted by the 3-D electronic display 200. According to some examples, the plate light guide 210 may be substantially similar to the plate light guide 110 described above with respect to the polarization-mixing light guide 100 or the multibeam diffraction grating-based backlight. For example, the plate light guide 210 may be a slab optical waveguide that is a planar sheet of dielectric material configured to guide light by total internal reflection.

Further, the plate light guide 210 includes a polarization retarder layer 212 to redistribute light of polarization components (or equivalently 'to redistribute the polarization components') of the guided light beam into predetermined combinations of the polarization components. In some examples, the redistribution may interchange a first polarization component and a second polarization component of the guided light. The first polarization component may be a transverse electric (TE) polarization component, while the second polarization component may be a transverse magnetic (TM) polarization component, for example. According to some examples, the polarization retarder layer 212 of the plate light guide 210 may be substantially similar to the polarization retarder layer 120 described above with respect to the polarization-mixing light guide 100 or the multibeam diffraction grating-based backlight. In particular, the redistribution of light of or associated with the polarization components by the polarization retarder layer 212 is substantially similar to the redistribution of a portion of light described above for the polarization retarder layer 120, by definition herein, according to some examples.

The 3-D electronic display 200 illustrated in FIG. 5 further includes an array of multibeam diffraction gratings 220. The array of multibeam diffraction gratings 220 are at or adjacent to a surface of the plate light guide 210. In some examples, a multibeam diffraction grating 220 of the array may be substantially similar to the multibeam diffraction grating 130 of the polarization-mixing light guide 100 serving as the multibeam diffraction grating-based backlight, described above. In particular, the multibeam diffraction grating 220 is configured to scatter or couple out a portion of the first (e.g., TE) polarization component of the guided light beam as a plurality of light beams 204. Further, the multibeam diffraction grating 220 is configured to direct the light beams 204 in a corresponding plurality of different principal angular directions.

In some examples, the multibeam diffraction grating 220 includes a chirped diffraction grating. In some examples, diffractive features (e.g., grooves, ridges, etc.) of the multibeam diffraction grating 220 are curved diffractive features. In yet other examples, the multibeam diffraction grating 220 of the array includes a chirped diffraction grating having curved diffractive features. For example, the curved diffractive features may include a ridge or a groove that is curved (i.e., continuously curved or piece-wise curved) and a spacing between the curved diffractive features that may vary as a function of distance across the multibeam diffraction grating 220.

Further, according to some examples, the polarization retarder layer 212 is adjacent to a surface of the plate light guide 210 opposite the plate light guide surface at which the multibeam diffraction grating array is located. In other examples, the polarization retarder layer 212 is located between and spaced apart from both of a front surface and a back surface of the plate light guide 210. In some examples, the polarization retarder layer 212 may be substantially distributed throughout the plate light guide 210. For example, the plate light guide 210 may comprise a birefringent material such that the plate light guide 210 is also the polarization retarder layer 212.

As illustrated in FIG. 5, the 3-D electronic display 200 further includes a light valve array 230. The light valve array 230 includes a plurality of light valves configured to modulate the plurality of differently directed light beams 204, according to various examples. In particular, the light valves of the light valve array 230 modulate the differently directed light beams 204 to provide the modulated light beams 202 that are the pixels of the 3-D electronic display 200. Moreover, different ones of the modulated, differently directed light beams 202 may correspond to different views of the 3-D electronic display. In various examples, different types of light valves in the light valve array 230 may be employed including, but not limited to, liquid crystal light valves, electrowetting light valves, and electrophoretic light valves. Dashed lines are used in FIG. 5 to represent modulation of the light beams 202.

In some examples (e.g., as illustrated in FIG. 5), the 3-D electronic display 200 further includes a light source 240. The light source 240 is configured to provide light that propagates in the plate light guide 210 as the guided light. In particular, the guided light is light from the light source 240 that is coupled into the edge or end of the plate light guide 210, according to some examples. In various examples, the light source 240 may be substantially any source of light including, but not limited to, one or more of a light emitting diode (LED), a fluorescent light and a laser. In some examples, the light source 240 may produce a substantially monochromatic light having a narrowband spectrum denoted by a particular color. In particular, the color of the monochromatic light may be a primary color of a particular color gamut or color model (e.g., a red-green-blue (RGB) color model). A lens, a collimating reflector or similar device may facilitate coupling of light into the plate light guide 110 at the end or edge thereof, for example.

Figure 6:
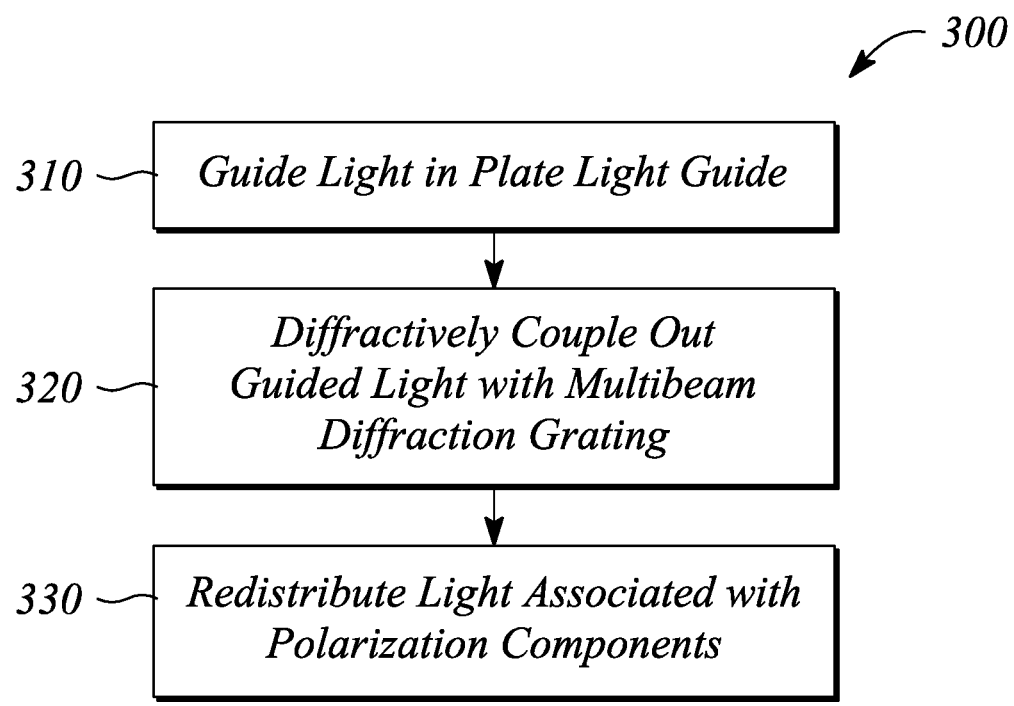
FIG. 6 illustrates a flow chart of a method of electronic display operation, according to an example consistent with the principles described herein.

According to some examples of the principles described herein, a method of electronic display operation is provided. FIG. 6 illustrates a flow chart of a method 300 of electronic display operation, according to an example consistent with the principles described herein. As illustrated in FIG. 6, the method 300 of electronic display operation includes guiding 310 light in a plate light guide as a beam of light at a non-zero propagation angle. In some examples, the plate light guide and the guided light may be substantially similar to the plate light guide 110 and the guided light beam 104, described above with respect to polarization-mixing light guide 100. In particular, in some examples, the plate light guide may guide 310 the guided light beam according to total internal reflection and the guided light beam may be collimated. Further, the plate light guide may be a substantially planar dielectric optical waveguide or slab waveguide (e.g., a planar dielectric sheet), in some examples.

As illustrated in FIG. 6, the method 300 of electronic display operation further includes diffractively coupling out 320 a portion of the guided light beam using a multibeam diffraction grating. According to various examples, the multibeam diffraction grating is located at a surface of the plate light guide. For example, the multibeam diffraction grating may be formed in the surface of the plate light guide as grooves, ridges, etc. In other examples, the multibeam diffraction grating may include a film on the plate light guide surface. In some examples, the multibeam diffraction grating is substantially similar to the multibeam diffraction grating 130 described above with respect to the polarization-mixing light guide 100 serving as the multibeam diffraction grating-based backlight.

In particular, the portion of guided light that is diffractively coupled out 320 of the plate light guide by the multibeam diffraction grating produces a plurality of light beams. The plurality of light beams is redirected away from the plate light guide surface. Moreover, a light beam of the light beam plurality that is redirected away from the surface has a different principal angular direction from other light beams of the plurality. In some examples, each redirected light beam of the plurality has a different principal angular direction relative to the other light beams of the plurality.

Further, the portion of guided light that is diffractively coupled out 320 by the multibeam diffraction grating may be a portion corresponding substantially to a first polarization component. In particular, a larger portion of the first polarization component may be diffractively coupled out 320 relative to a second polarization component of the guided light. For example, the multibeam diffraction grating may preferentially diffractively couple out 320 the first polarization component of the guided light in a vicinity of the surface at which the multibeam diffraction grating is located. The second polarization component may be either substantially not coupled out or coupled out by the multibeam diffraction grating at a much lower level than the first polarization component. In some examples, the first polarization component may be a transverse electric (TE) polarization component and the second polarization component may be a transverse magnetic (TM) polarization component.

Diffractively coupling out 320 a portion of the guided light may change a ratio of the first and second polarization components of the guided light in a region of the plate light guide beyond the multibeam diffraction grating (e.g., further along the optical path of the plate light guide downstream from the multibeam diffraction grating), according to various examples. For example, the multibeam diffraction grating may be a first member of an array of multibeam diffraction gratings positioned along a length of the plate light guide representing the optical path that the guided light travels. After the portion of the guided light is diffractively coupled out 320 by the first member of the array of multibeam diffraction gratings, a portion of guided light remaining in the plate light guide may be guided at the above-described non-zero propagation angle toward another multibeam diffraction grating of the array. The portion of the guided light remaining after diffractive coupling out 320 by the first member may include a higher level of the second polarization component (e.g., the TM polarization component) than a level of the first polarization component (e.g., the TE polarization component) as a result of the change in the ratio produced by diffractively coupling out 320 by the first multibeam diffraction grating member, for example.

According to various examples (e.g., as illustrated in FIG. 6), the method 300 of electronic display operation further includes redistributing 330 light associated with a first polarization component and a second polarization component of the guided light beam to provide polarization mixing of the first and second polarization components. Redistributing 330 light associated with the polarization components to provide polarization mixing may be performed on the remaining guided light after diffractively coupling out 320 guided light. In some examples, redistributing 330 light may interchange the first polarization component and the second polarization component of the guided light to provide the polarization mixing. According to various examples, redistributing 330 light associated with the first and second polarization components may be provided by a polarization retarder that is substantially similar to the polarization retarder 120 described above with respect to the polarization-mixing light guide 100.

In particular, redistributing 330 light associated with the first polarization component and the second polarization component may comprise passing the guided light beam through a polarization retarder layer. In some examples, the polarization retarder layer may provide a total round trip optical path length sufficient to introduce about one-half wavelength differential phase delay between the first and second polarization components or a linear superposition thereof, according to some examples. The polarization mixing achieved by redistributing 330 light associated with the first and second polarization components may result in the first (e.g., TE) polarization component of the guided light being replenished, i.e., having a level corresponding to a level of the second polarization component prior to polarization mixing. Further, the polarization mixing achieved by redistributing 330 light associated with the first and second polarization components may result in the level of the second polarization component of the guided light corresponding to the first polarization component level prior to such polarization mixing.

According to some examples, guiding 310 light in the plate light guide, diffractively coupling out 320 a portion of the guided light, and redistributing 330 light associated with the first and second polarization components may be repeated. In particular, the method 300 of electronic display operation may further include diffractively coupling out another portion of the guided light using another multibeam diffraction grating after redistributing light associated with the first and second polarization components. Further, the method 300 of electronic display operation may include redistributing light associated with the first and second polarization components after diffractively coupling out the other portion. The other multibeam diffraction grating may be a member of an array of multibeam diffraction gratings, wherein members of the array are located along a length of the plate light guide representing an optical path for the guided light, for example. As such (not illustrated), diffractively coupling out portions of the guided light and subsequently redistributing light associated with the first and second polarization components of the remaining guided light may be repeated for each of the multibeam diffraction gratings of the array along the plate light guide length, for example. Repeating diffractively coupling out 320 and redistributing 330 light for a guided light beam in the plate light guide may produce a substantially consistent level or intensity of coupled out light beams during the electronic display operation than without redistribution 330 of the light.

According to some examples (not illustrated), the method 300 of electronic display operation further includes modulating the plurality of light beams that is diffractively coupled out 320 of the plate light guide by the multibeam diffraction grating using a corresponding plurality of light valves, e.g., as illustrated in FIG. 5. The plurality of light beams may be modulated by passing through or otherwise interacting with the corresponding plurality of light valves, for example. The modulated light beams may form pixels of a three-dimensional (3-D) electronic display. For example, the modulated light beams may provide a plurality of views of the 3-D electronic display (e.g., a glasses-free, 3-D electronic display).

In some examples, the 3-D electronic display may be substantially similar to the 3-D electronic display 200, described above. Further, according to various examples, the light valves employed in modulating the light beams may be substantially similar to the light valves of the light valve array 230 of the 3-D electronic display 200, described above. For example, the light valves may include liquid crystal light valves. In another example, the light valves may be another type of light valve including, but not limited to, an electrowetting light valve or an electrophoretic light valve.

Thus, there have been described examples of a polarization-mixing light guide, the polarization-mixing light guide configured as a multibeam grating-based backlight, a 3-D electronic display, and a method of electronic display operation that employ a polarization retarder to provide polarization mixing within a plate light guide. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A polarization-mixing light guide comprising:
a plate light guide configured to guide a beam of light using total internal reflection at a non-zero propagation angle, the light beam comprising a first polarization component and a second polarization component;
a plurality of diffraction gratings, each diffraction grating of the diffraction grating plurality being configured to preferentially scatter out a portion of the guided light beam having the first polarization component as a plurality of light beams having different principal angular directions corresponding to directions of different views of a three-dimensional (3-D) electronic display; and
a polarization retarder located within the plate light guide between opposing guiding surfaces of the plate light guide, the guided light beam being configured to pass through the polarization retarder and the polarization retarder being configured to redistribute the first polarization component of the guided light beam into a predetermined linear combination of the first polarization component and the second polarization component and configured to redistribute the second polarization component of the guided light beam into another predetermined linear combination of the first and second polarization components.

2. The polarization-mixing light guide of claim 1, wherein the polarization retarder is to substantially interchange the first polarization component and the second polarization component of the guided light beam, an optical path length of the guided light beam through the polarization retarder at the non-zero propagation angle is to introduce about a one-half wavelength differential phase delay between a linear superposition of the first and second polarization components of the guided light beam.

3. The polarization-mixing light guide of claim 1, wherein the polarization retarder comprises a layer adjacent to a surface of the plate light guide opposite a plate light guide surface out of which the first polarization component is to be scattered.

4. The polarization-mixing light guide of claim 1, wherein the polarization retarder comprises a layer located within the plate light guide between and spaced apart from a front surface and a back surface of the plate light guide.

5. The polarization-mixing light guide of claim 1, wherein the polarization retarder comprises a uniaxial retarder film.

6. The polarization-mixing light guide of claim 1, wherein each diffraction grating comprises a multibeam diffraction grating at a surface of the plate light guide to preferentially scatter out the portion of the light beam having the first polarization component as a plurality of scattered light beams directed away from the plate light guide surface, the plurality of scattered light beams to have different angular directions of scatter,
wherein the polarization-mixing light guide is a multibeam grating-based backlight.

7. The polarization-mixing light guide of claim 6, wherein the multibeam diffraction grating comprises a chirped diffraction grating.

8. The polarization-mixing light guide of claim 6, wherein the multibeam diffraction grating comprises one of curved grooves and curved ridges that are spaced apart from one another.

9. A three-dimensional (3-D) electronic display comprising the polarization-mixing light guide of claim 6, the 3-D electronic display further comprising a light valve to modulate a light beam of the scattered light beam plurality, the light valve being adjacent to the multibeam diffraction grating, wherein the scattered light beam to be modulated by the light valve corresponds to a pixel of the 3-D electronic display.

10. A three-dimensional (3-D) electronic display comprising:
a plate light guide to guide a beam of light at a non-zero propagation angle according to total internal reflection, the plate light guide including a polarization retarder located between opposing surfaces of the plate light guide, the polarization retarder being configured to redistribute different polarization components of the guided light beam that passes through the polarization retarder into predetermined linear combinations of the different polarization components; and
an array of multibeam diffraction gratings at a surface of the plate light guide, each multibeam diffraction grating of the multibeam diffraction grating array being configured to diffractively couple out a portion of a first polarization component of the different polarization components as a plurality of coupled-out light beams having different principal angular directions corresponding to viewing directions of different views of the 3-D electronic display,
wherein the polarization retarder is to facilitate utilization of the guided light beam by the array of multibeam diffraction gratings.

11. The 3-D electronic display of claim 10, further comprising:
a light valve array to modulate the coupled-out light beams having the plurality of different principal angular directions, the modulated light beams representing pixels of the 3-D electronic display.

12. The 3-D electronic display of claim 11, wherein the light valve array comprises a plurality of liquid crystal light valves.

13. The 3-D electronic display of claim 10, wherein the polarization retarder is a layer adjacent to a surface of the plate light guide opposite the plate light guide surface at which the multibeam diffraction grating array is located.

14. The 3-D electronic display of claim 10, wherein a multibeam diffraction grating of the multibeam diffraction grating array is a chirped diffraction grating having curved diffractive features.

15. The 3-D electronic display of claim 10, wherein the first polarization component of the different polarization components is a transverse electric (TE) polarization component and a second polarization component of the different polarization components is a transverse magnetic (TM) polarization component, the multibeam diffraction grating to preferentially couple out a portion of the TE polarization component.

16. The 3-D electronic display of claim 15, wherein the polarization retarder is to substantially interchange the TE polarization component and the TM polarization component of the guided light beam.

17. A method of electronic display operation, the method comprising:

guiding light in a plate light guide as a beam of light at a non-zero propagation angle using total internal reflection;

diffractively coupling out a portion of the guided light beam using an array of multibeam diffraction gratings at a surface of the plate light guide, each multibeam diffraction grating of the multibeam diffraction grating array producing a plurality of coupled-out light beams directed away from the plate light guide in a plurality of different principal angular directions corresponding to different viewing directions of different views of a three-dimensional (3-D) electronic display; and redistributing a first polarization component and a second polarization component of the guided light beam by passing the guided light beam through a polarization retarder located within the plate light guide to provide polarization mixing of the first and second polarization components, wherein diffractively coupling out a portion of the guided light beam preferentially couples out the first polarization component.

18. The method of electronic display operation of claim 17, further comprising:

diffractively coupling out another portion of the guided light beam using another multibeam diffraction grating after redistributing the first and second polarization components; and redistributing the first and second polarization components of a remaining portion of the guided light beam after diffractively coupling out the other portion.

19. The method of electronic display operation of claim 17, wherein redistributing the first polarization component and the second polarization component of the guided light beam interchanges the first and second polarization components.

20. The method of electronic display operation of claim 17, further comprising modulating the plurality of coupled-out light beams using a corresponding plurality of light valves, the modulated plurality of coupled-out light beams forming pixels of a three-dimensional (3-D) electronic display.

* * * * *